US008177371B2

(12) United States Patent
Nagai (10) Patent No.: US 8,177,371 B2
(45) Date of Patent: May 15, 2012

(54) LIGHT MODULATION ELEMENT OF PROJECTOR, POSITIONING METHOD FOR LIGHT MODULATION ELEMENT UNITS, AND PROJECTOR

(75) Inventor: Kazuki Nagai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 212 days.

(21) Appl. No.: 12/725,027

(22) Filed: Mar. 16, 2010

(65) Prior Publication Data
US 2010/0253921 A1    Oct. 7, 2010

(30) Foreign Application Priority Data

Apr. 1, 2009   (JP) ................................. 2009-088706

(51) Int. Cl.
*G03B 21/26* (2006.01)
(52) U.S. Cl. ........................ 353/33; 353/121; 353/122
(58) Field of Classification Search .................... 353/31, 353/33, 34, 38, 81, 94, 98, 99, 121, 122; 348/750, 751, 756, 757, 758; 345/613, 690, 345/694, 698; 349/5, 6, 7, 8, 9, 10; 359/259, 359/316
See application file for complete search history.

(56) References Cited

U.S. PATENT DOCUMENTS

| 7,270,416 | B2 * | 9/2007 | Yamanaka et al. | 353/20 |
| 7,471,822 | B2 * | 12/2008 | Roth et al. | 382/162 |
| 7,872,216 | B2 * | 1/2011 | Miyazawa | 250/208.1 |
| 7,918,560 | B2 * | 4/2011 | Miyazawa | 353/20 |
| 7,959,299 | B2 * | 6/2011 | Miyazawa | 353/34 |
| 7,973,750 | B2 * | 7/2011 | Miyazawa | 345/87 |
| 2004/0246389 | A1 * | 12/2004 | Roth | 349/5 |
| 2005/0185139 | A1 * | 8/2005 | Yamanaka et al. | 353/20 |
| 2008/0259231 | A1 * | 10/2008 | Miyazawa | 349/8 |
| 2008/0304016 | A1 * | 12/2008 | Miyazawa | 353/20 |
| 2009/0002633 | A1 * | 1/2009 | Miyazawa | 353/20 |
| 2009/0009724 | A1 * | 1/2009 | Miyazawa | 353/31 |
| 2009/0147031 | A1 * | 6/2009 | Miyazawa | 345/690 |
| 2010/0225885 | A1 * | 9/2010 | Miyazawa | 353/20 |

FOREIGN PATENT DOCUMENTS

JP    A-10-304284    11/1998

* cited by examiner

*Primary Examiner* — Francis M Legasse, Jr.
*Assistant Examiner* — Bao-Luan Le
(74) *Attorney, Agent, or Firm* — Oliff & Berridge, PLC (57) ABSTRACT

A method for positioning a light modulation element of a projector. The projector including a first light modulation element unit having first through third light modulation elements and a second light modulation element unit having fourth through sixth light modulation elements. The projector further including a combining system for combining a first image light supplied from the first light modulation element unit and a second image light supplied from the second light modulation element unit and supplying the combined light, and positioning the first light modulation element unit and the second light modulation element unit such that color of combined light of color lights obtained from the first light modulation element, the second light modulation element, and the sixth light modulation element becomes a predetermined color.

5 Claims, 4 Drawing Sheets

COMBINED LIGHT SUPPLIED FROM POLARIZED
LIGHT COMBINING PRISM 800

$P_G$ : PIXEL OF LIGHT MODULATION ELEMENT 410G
$P_R$ : PIXEL OF LIGHT MODULATION ELEMENT 610R
$P_B$ : PIXEL OF LIGHT MODULATION ELEMENT 610B $P_G$ : PIXEL OF LIGHT MODULATION ELEMENT 610G
$P_R$ : PIXEL OF LIGHT MODULATION ELEMENT 410R
$P_B$ : PIXEL OF LIGHT MODULATION ELEMENT 410B

LIGHT MODULATION ELEMENT OF PROJECTOR, POSITIONING METHOD FOR LIGHT MODULATION ELEMENT UNITS, AND PROJECTOR

BACKGROUND

1. Technical Field

The present invention relates to a light modulation element positioning method for a projector, and a projector.

2. Related Art

Currently, such a projection method is known which positions two projectors such that pixels of a light modulation element included in one of the two projectors agree with corresponding pixels of a light modulation element included in the other projector. By this method, identical images can be projected from the projectors onto the same screen (this method is called "stack projection"). Image light projected by the stack projection has approximately twice higher luminance, and becomes considerably bright image light when projected on the screen. Also, such a projection method has been practiced which shifts the pixels of the light modulation element of the one projector from the corresponding pixels of the light modulation element of the other projector by ½ pixel for each in an oblique direction and projects identical images from the respective projectors to increase resolution of the images (this method is called "pixel shift projection")

In case of the stack projection or the pixel shift projection described above, however, the positions of the two projectors need to be controlled with high accuracy, and generally only a skilled person can perform appropriate positioning. Particularly in case of the pixel shift projection, a reference and a target for positioning are difficult to be determined in setting a desired pixel shift condition. Thus, the control required for the pixel shift projection becomes more difficult.

Also, a projector which includes two light modulation element units (first light modulation element unit and second light modulation element unit) is known (see JP-A-10-304284, for example). According to the projector disclosed in JP-A-10-304284, the first light modulation element unit receives first polarized light component (P-polarized light component) light from a light source and supplies first image light, and the second light modulation element unit receives second polarized light component (S-polarized light component) light from the light source and supplies second image light. The first image light and the second image light are combined by a polarized light combining system and projected on a screen through a projection system. Bach of the first light modulation element unit and the second light modulation element unit has light modulation elements for R, G, and B lights and a combining system for combining the R, G, and B lights outputted from the light modulation elements for R, G, and B lights as one unit.

According to the projector shown in JP-A-10-304284 which includes the two light modulation element units (the first light modulation element unit and the second light modulation element unit), the respective light modulation elements for R, G, and B lights (liquid crystal panels) of the first light modulation element unit are highly accurately positioned such that the corresponding pixels of the respective light modulation elements agree with one another, and also the respective light modulation elements for R, G, and B lights (liquid crystal panels) of the second light modulation element unit are highly accurately positioned such that the corresponding pixels of the respective light modulation elements agree with one another. Then, the first light modulation element unit and the second light modulation element unit are highly accurately positioned. By this method, it is expected that the first image light outputted from the first light modulation element unit and the second image light outputted from the second light modulation element can be displayed in the desired pixel shift condition.

However, when the first image light outputted from the first light modulation element unit and the second image light outputted from the second light modulation element unit are desired to be displayed on the screen in the pixel shift condition for shifting ½ pixel for each pixel in an oblique direction according to the projector disclosed in JP-A-10-304284, the positions of the first light modulation element unit and the second light modulation element unit need to be highly accurately controlled at the time of assembly of the projector. As explained above, in case of the pixel shift projection, a reference and a target for positioning are difficult to be determined in setting the desired pixel shift condition. Thus, the positioning becomes further difficult, and the productivity of the projector lowers.

SUMMARY

It is an advantage of some aspects of the invention to provide a light modulation element positioning method for a projector, and a projector, which can easily and highly accurately position light modulation elements such that respective image lights supplied from two light modulation element units can be set in a desired pixel shift condition.

(1) A first aspect of the invention is directed to a method for positioning a light modulation element of a projector. The projector includes: a first light modulation element unit having a first light modulation element for modulating a first color light and forming a first image, a second light modulation element for modulating a second color light and forming a second image, a third light modulation element for modulating a third color light and forming a third image, and a first combining system for combining the respective color lights modulated by the first through third light modulation elements and supplies first image light; a second light modulation element unit having a fourth light modulation element for modulating the first color light and forming a fourth image, a fifth light modulation element for modulating the second color light and forming a fifth image, a sixth light modulation element for modulating the third color light and forming a sixth image, and a second combining system for combining the respective color lights modulated by the fourth through sixth light modulation elements and supplies second image light; and a combining system for combining the first image light supplied from the first light modulation element unit and the second image light supplied from the second light modulation element unit and supplying combined light. The light modulation element positioning method includes: positioning pixels of the first through third images such that the pixels of the first image agree with the corresponding pixels of the second image and that the pixels of the first image and the second image shift from the corresponding pixels of the third image by a predetermined amount in a predetermined direction; positioning pixels of the fourth through sixth images such that the pixels of the fourth image agree with the corresponding pixels of the fifth image and that the pixels of the sixth image shift from the corresponding pixels of the fourth image and the fifth image by a predetermined amount in a predetermined direction; and obtaining the color lights from the first light modulation element and the second light modulation element of the first light modulation element unit, and the color light from the sixth light modulation element of the second light modulation element unit, and positioning the first light modulation element unit and the second light modulation element unit such that the color of combined light of the color lights obtained from the first light modulation element, the second light modulation element, and the sixth light modulation element and combined by the combining system becomes a predetermined color.

According to the method for positioning the light modulation element of the projector of this aspect, the first light modulation element unit is positioned such that the pixels of the first image agree with the corresponding pixels of the second image and that the respective pixels of the first and second images shift from the corresponding pixels of the third image by the predetermined amount in the predetermined direction (ideal pixel shift condition). Also, the second light modulation element unit is positioned such that the pixels of the fourth image agree with the corresponding pixels of the fifth image and that the respective pixels of the fourth and fifth images shift from the corresponding pixels of the sixth image by the predetermined amount in the predetermined direction (ideal pixel shift condition).

When the first light modulation element unit and the second light modulation element unit are positioned in advance such that the respective light modulation elements are in the ideal pixel shift condition, the first image light supplied from the first light modulation element unit and the second image light supplied from the second light modulation element unit can be displayed in the ideal pixel shift condition only by appropriately positioning the first light modulation element unit and the second light modulation element unit. In this case, the first light modulation element unit and the second light modulation element unit are positioned such that the color of the combined light produced by combining the first image light and the second image light using a polarized light combining system becomes the predetermined color. Thus, positioning can be easily and highly accurately performed by referring to a positioning target thus established.

(2) In the method for positioning the light modulation element of the projector of the first aspect, it is preferable that positioning the pixels of the first through third images and positioning the pixels of the fourth through sixth images are performed before the first light modulation element unit and the second light modulation element unit are assembled into the projector, and that obtaining the respective color lights and positioning the first light modulation element unit and the second light modulation element unit are performed after the first light modulation element unit and the second light modulation element unit are assembled into the projector.

According to this method, positioning the pixels of the first through third images and positioning the pixels of the fourth through sixth images are performed in advance before the first light modulation element unit and the second light modulation element unit are assembled into the projector. Thus, assembly of the projector can be facilitated. In this case, positioning the pixels of the first through third images and positioning the pixels of the fourth through sixth images are executed by using a dedicated positioning device. The dedicated light modulation element positioning device can use a projection lens and other optical systems having higher performance than that of a projector available on the market. Thus, positioning can be performed highly accurately and relatively easily.

(3) In the method for positioning the light modulation element of the projector of the first aspect, it is preferable that the predetermined direction of shifting the pixels for the positioning is an oblique direction, and that the predetermined amount of shifting the pixels for the positioning is ½ pixel for each of the pixels.

According to this method, an image displayed on a screen has approximately twice higher resolution.

(4) In the method for positioning the light modulation element of the projector of the first aspect, it is preferable that the first through third color lights are red light, blue light, and green light, respectively. In this case, the first light modulation element and the second light modulation element are a light modulation element for red light and a light modulation element for blue light, respectively, and the third light modulation element is a light modulation element for green light. Also, the fourth light modulation element and the fifth light modulation element are a light modulation element for red light and a light modulation element for blue light, respectively, and the sixth light modulation element is a light modulation element for green light.

According to this method, the first light modulation element unit and the second light modulation element unit are positioned such that the color of the combined light supplied from the combining system becomes white (W). In this case, the target for positioning the first light modulation element unit and the second light modulation element unit can be clarified, and thus positioning can be easily and highly accurately performed. When the light modulation element corresponding to the one color light (green light) of the first light modulation element unit is actuated, green light is supplied from the first light modulation element unit. When the two light modulation elements corresponding to the two color lights (red light and blue light) of the second light modulation element unit are actuated, red light and blue light are supplied from the second light modulation element unit. Thus, the combined light supplied from the combining system becomes white (W). This applies when the two light modulation elements corresponding to the two color lights (red light and blue light) of the first light modulation element unit and the one light modulation element corresponding to the color light (green light) of the second light modulation element unit are actuated.

(5) A projector according to a second aspect of the invention includes: a first light modulation element unit having a first light modulation element for modulating a first color light and forming a first image, a second light modulation element for modulating a second color light and forming a second image, a third light modulation element for modulating a third color light and forming a third image, and a first combining system for combining the respective color lights modulated by the first through third light modulation elements and supplies first image light to dispose pixels of the first image at such positions as to agree with corresponding pixels of the second image and to dispose the pixels of the first image and the second image at such positions as to shift from corresponding pixels of the third image by a predetermined amount in a predetermined direction; a second light modulation element unit having a fourth light modulation element for modulating the first color light and forming a fourth image, a fifth light modulation element for modulating the second color light and forming a fifth image, a sixth light modulation element for modulating the third color light and forming a sixth image, and a second combining system for combining the respective color lights modulated by the fourth through sixth light modulation elements and supplies second image light to dispose pixels of the fourth image at such positions as to agree with corresponding pixels of the fifth image and to dispose the pixels of the fourth image and the fifth image at such positions as to shift from corresponding pixels of the sixth image by a predetermined amount; and a combining system for combining the first image light supplied from the first light modulation element unit and the second image light supplied from the second light modulation element unit and supplying combined light. The pixels of the third image are formed substantially at the same positions as the positions of the pixels of the fourth image and the fifth image, and the pixels of the sixth image are formed substantially at the same positions as the positions of the pixels of the first image and the second image.

According to the projector of the second aspect, images are projected in an ideal pixel shift condition. Thus, image display with high resolution can be achieved. Moreover, the first light modulation element unit and the second light modulation element unit are easily and highly accurately positioned. Thus, even when the positional relationship between the first light modulation element unit and the second light modulation element unit deviates from the ideal relationship by change with elapse of time, the positions can be easily re-adjusted.

BRIEF DESCRIPTION OF THE DRAWINGS

The invention will be described with reference to the accompanying drawings, wherein like numbers reference like elements.

DESCRIPTION OF EXEMPLARY EMBODIMENT

An exemplary embodiment according to the invention is hereinafter described.

Figure 1:
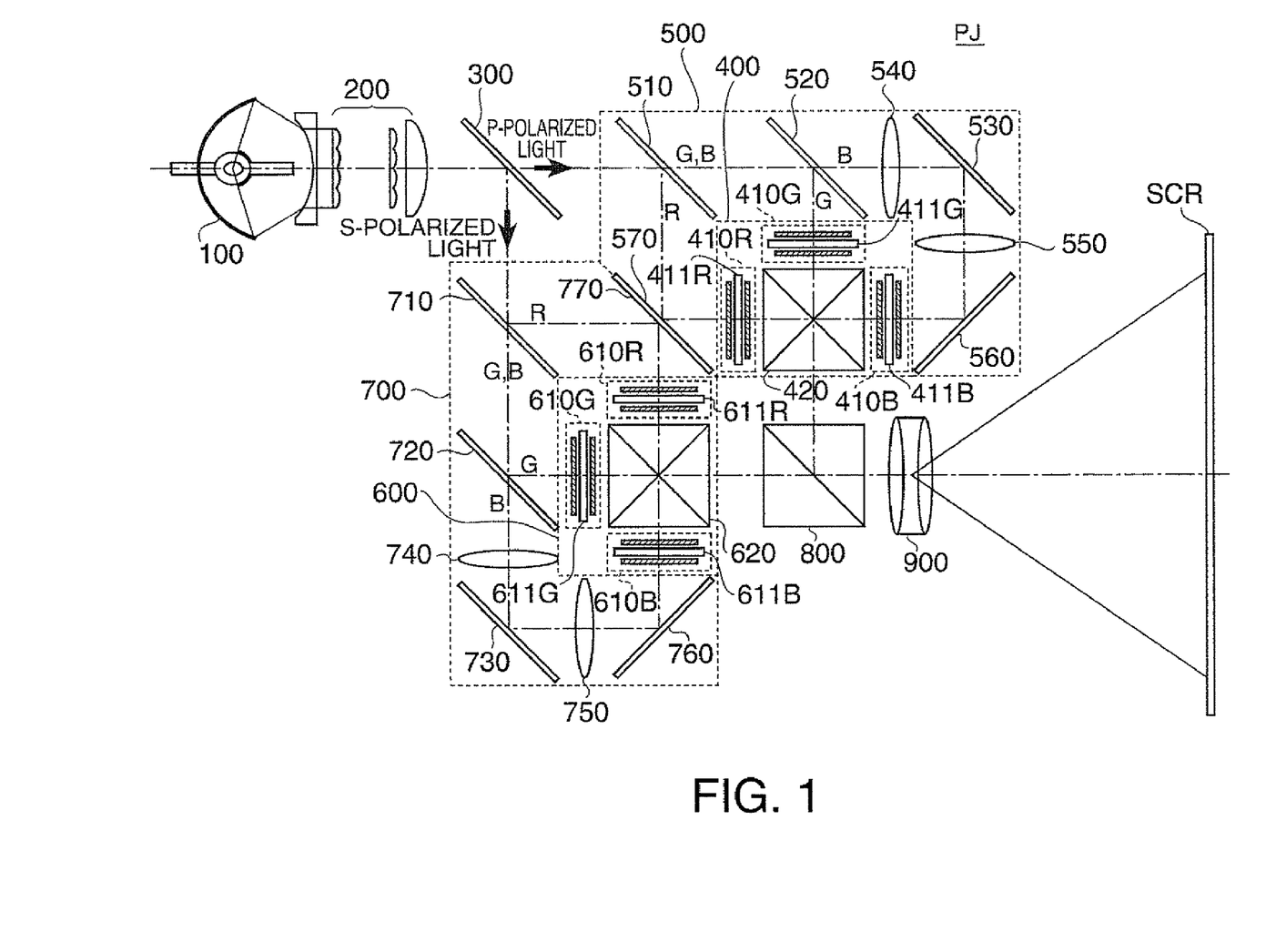
FIG. 1 illustrates the structure of optical systems of a projector PJ according to an embodiment.

FIG. 1 illustrates the structure of optical systems included in a projector PJ according to this embodiment. As illustrated in FIG. 1, the projector PJ in this embodiment includes a light source 100 which emits lights containing a first color light (red light), a second color light (green light), and a third color light (blue light), an integrator system 200, a polarized light separation mirror 300 as a polarized light separation system, a first light modulation element unit 400 which supplies first image light, a first light guide system 500 which guides a first polarized light component (p-polarized light) separated by the polarized light separation mirror 300 to the first light modulation element unit 400, a second light modulation element unit 600 which supplies second image light, a second light guide system 700 which guides a second polarized light component (s-polarized light) separated by the polarized light separation mirror 300 to the second light modulation element unit 600, a polarized light combining prism 800 as a polarized light combining system, and a projection system 900 which expands image light combined by the polarized light combining prism 800 and projects the expanded image light on a screen SCR.

The first light modulation element unit 400 includes a light modulation element 410R for red light, a light modulation element 410G for green light, a light modulation element 410B for blue light, and a cross dichroic prism 420 as a first color combining system for combining the red light, green light, and blue light modulated by the light modulation elements 410R, 410G, and 410B, respectively. The respective light modulation elements 410B, 410G, and 410B, and the cross dichroic prism 420 are combined as one unit, and called "panel on prism (POP)" as well.

The light modulation element 410R has a liquid crystal panel 411R, an entrance side polarization plate disposed on the entrance side of the liquid crystal panel 411R, and an exit side polarization plate disposed on the exit side of the liquid crystal panel 411R. The light modulation element 410G has a liquid crystal panel 411G, an entrance side polarization plate disposed on the entrance side of the liquid crystal panel 411G, and an exit side polarization plate disposed on the exit side of the liquid crystal panel 411G. The light modulation element 410B has a liquid crystal panel 411B, an entrance side polarization plate disposed on the entrance side of the liquid crystal panel 411B, and an exit side polarization plate disposed on the exit side of the liquid crystal panel 411B. The reference numerals are not given to the entrance side polarization plates and the exit side polarization plates.

The first light modulation element unit 400 having this structure supplies first image light having the first polarized light component (p-polarized light).

The first light guide system 500 includes: a dichroic mirror 510 which reflects red light (R) contained in p-polarized lights of red light (R), green light (G), and blue light (B) having passed through the polarized light separation mirror 300, and transmits the green light (G) and the blue light (B) of the p-polarized lights; a dichroic mirror 520 which reflects the green light (G) contained in the green light (G) and the blue light (B) transmitted by the dichroic mirror 510, and transmits the blue light (B); a reflection mirror 530 which reflects the blue light (B) transmitted by the dichroic mirror 520; a lens 540 disposed on the entrance side of the reflection mirror 530; a lens 550 disposed on the exit side of the reflection mirror 530; a reflection mirror 560 which guides the blue light (B) having passed through the lens 550 toward the light modulation element 410B; and a reflection mirror which guides the red light (R) reflected by the dichroic mirror 510 toward the light modulation element 410R.

On the other hand, the second light modulation element unit 600 includes a light modulation element 610R for red light, a light modulation element 610G for green light, a light modulation element 610B for blue light, and a cross dichroic prism 620 as a second color combining system for combining the red light, green light, and blue light modulated by the light modulation elements 610R, 610G, and 610B, respectively. The respective light modulation elements 610R, 610G, and 610B, and the cross dichroic prism 620 are combined as one unit similarly to the first light modulation element unit 400.

The light modulation element 610R has a liquid crystal panel 611R, an entrance side polarization plate disposed on the entrance side of the liquid crystal panel 611R, and an exit side polarization plate disposed on the exit side of the liquid crystal panel 611R. The light modulation element 610G has a liquid crystal panel 611G, an entrance side polarization plate disposed on the entrance side of the liquid crystal panel 611G, and an exit side polarization plate disposed on the exit side of the liquid crystal panel 611G. The light modulation element 610B has a liquid crystal panel 611B, an entrance side polarization plate disposed on the entrance side of the liquid crystal panel 611B, and an exit side polarization plate disposed on the exit side of the liquid crystal panel 611B. The reference numerals are not given to the entrance side polarization plates and the exit side polarization plates.

The second light modulation element unit 600 having this structure supplies second image light having the second polarized light component (s-polarized light).

The second light guide system 700 includes: a dichroic mirror 710 which reflects red light (R) contained in s-polarized lights of red light (R), green light (G), and blue light (B) having passed the polarized light separation mirror 300, and transmits the green light (G) and the blue light (B) of the s-polarized lights; a dichroic mirror 720 which reflects the green light (G) contained in the green light (G) and the blue light (B) transmitted by the dichroic mirror 710, and transmits the blue light (B); a reflection mirror 730 which reflects the blue light (B) transmitted by the dichroic mirror 720; a lens 740 disposed on the entrance side of the reflection mirror 730; a lens 750 disposed on the exit side of the reflection mirror 730; a reflection mirror 760 which guides the blue light (B) having passed through the lens 750 toward the light modulation element 610B; and a reflection mirror 770 which guides the red light (R) reflected by the dichroic mirror 710 toward the light modulation element 610R. The reflection mirror 770 is the same mirror as the reflection mirror 570 of the first light guide system 500.

The polarized light combining prism 800 combines the first image light of the p-polarized light received from the first light modulation element unit 400 and the second image light of the s-polarized light received from the second light modulation element unit 600, and supplies the combined image light to the projection system 900. The combined image light supplied from the polarized light combining prism 800 is expanded by the projection system 900 to form a large screen image on the screen SCR.

The projector PJ including the first light modulation element unit 400 and the second light modulation element unit 600 described above can display a large screen image having high luminance on the screen SCR by highly accurately matching the pixels of the light modulation elements of the first light modulation element unit 400 with the corresponding pixels of the light modulation elements of the second light modulation element unit 600. Moreover, the projector PJ can display an image having high resolution by shifting the pixels of the light modulation elements of the first light modulation element unit 400 from the pixels of the light modulation elements of the second light modulation element unit 600 by ½ pixel for each in an oblique direction (called pixel shift projection) at the time of projection of the image.

For achieving the pixel shift projection, highly accurate positioning which obliquely shifts the pixels of the respective light modulation elements of the first light modulation element unit 400 from the pixels of the respective light modulation elements of the second light modulation element unit 600 by ½ pixel for each is required.

The light modulation element positioning method for the projector PJ according to this embodiment sequentially performs: a first light modulation element positioning step for positioning the three light modulation elements 410R, 410G, and 410B of the first light modulation element unit 400; a second light modulation element positioning step for positioning the three light modulation elements 610R, 610G, and 610B of the second light modulation element unit 600; and a light modulation element unit positioning step for positioning the first light modulation element unit 400 after completion of the first light modulation element positioning step, and positioning the second light modulation element unit 600 after completion of the second light modulation element positioning step.

The first light modulation element positioning step and the second light modulation element positioning step are executed by using a dedicated positioning device (called light modulation element positioning device). The first light modulation element positioning step and the second light modulation element positioning step are carried out before the first light modulation element unit 400 and the second light modulation element unit 600 are assembled in the projector PJ.

On the other hand, the light modulation element unit positioning step for positioning the first light modulation element unit 400 and the second light modulation element unit 600 is carried out at the time when the first light modulation element unit 400 and the second light modulation element unit 600 are assembled into the projector PJ by using an image projection function of the projector PJ.

The light modulation element positioning device (not shown) for executing the first light modulation element positioning step and the second light modulation element positioning step includes a light source, a light guide system for guiding respective lights in R, G, and B emitted from the light source toward the respective light modulation elements (such as the first light guide system 500 shown in FIG. 1), a projection lens, a pattern image data producing unit for producing pattern image data for positioning, and others. The optical systems and the like included in the light modulation element positioning device have higher performance than that of the optical systems included in the projector PJ as a product. Generally, the projection lens of the light modulation element positioning device has particularly higher performance.

The respective light modulation elements 410R, 410G, and 410B of the first light modulation element unit 400, and the respective light modulation elements 610R, 610G, and 610B for R, G, and B lights of the second light modulation element unit 600 are positioned by using the light modulation element positioning device having this structure. The positions of the light modulation elements are controlled by the following method.

Initially, the light modulation element unit as the positioning target (the first light modulation element unit 400 in this example) is disposed between the light guide system and the projection lens of the light modulation element positioning device. Then, the light source is actuated, and the light modulation elements 410R, 410G, and 410B are individually operated according to the pattern image data outputted from the pattern image data producing unit.

As a result, color lights corresponding to the pattern image data are outputted from the respective light modulation elements 410R, 410G, and 410B. These color lights are released from the cross dichroic prism 420, and expanded and projected on the screen through the projection lens. During projection of the pattern image in this step, positioning is performed such that the light modulation element 410R and the light modulation element 410B are shifted from the reference light modulation element (the light modulation element 410G in the first light modulation element unit 400 in this example) by ½ pixel for each of the corresponding pixels in an oblique direction. Since the projection lens and other units of the light modulation element positioning device have high performance, this positioning can be carried out highly accurately and relatively easily. The light modulation element positioning for the second light modulation element unit 600 can be similarly performed. The details of the positioning will be described later.

Figure 2A:
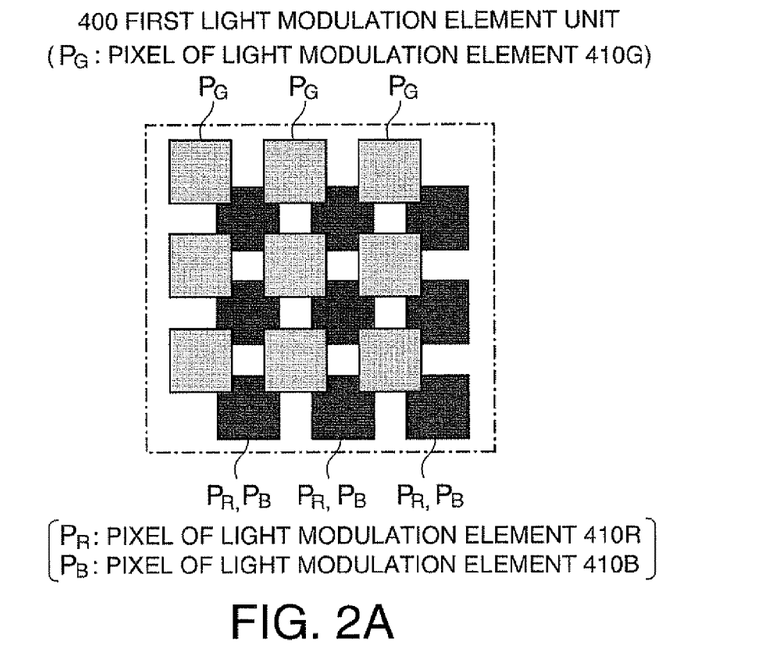
FIGS. 2A and 2B schematically illustrate positional relationships between light modulation elements positioned by a first light modulation element positioning step and a second light modulation element positioning step.
Figure 2B:
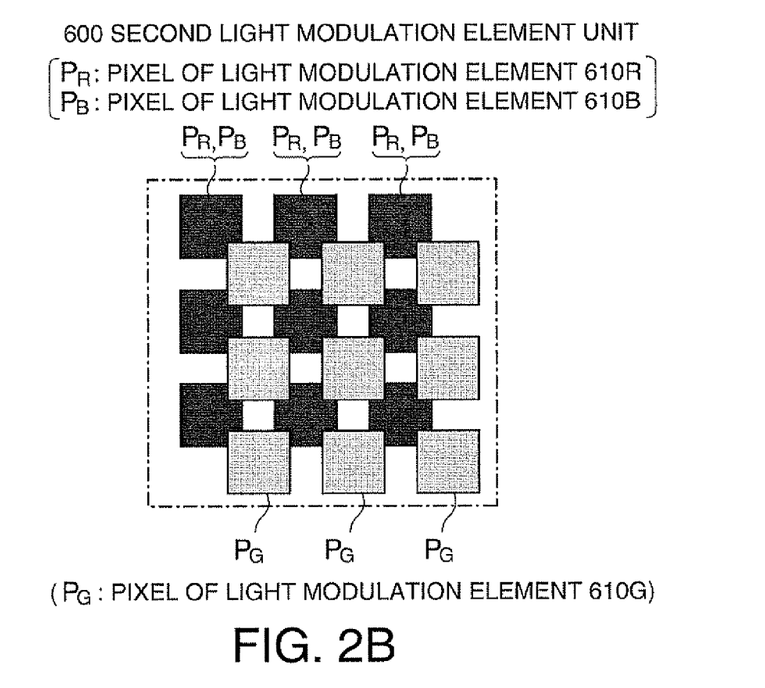

FIGS. 2A and 2B schematically illustrate positional relationships between the respective light modulation elements positioned by the first light modulation element positioning step and the second light modulation element positioning step. FIG. 2A schematically illustrates the positional relationship between the light modulation elements 410R, 410G, and 410B positioned by the first light modulation element positioning step. FIG. 2B schematically illustrates the positional relationship between the light modulation elements 610R, 610G, and 610B positioned by the second light modulation element positioning step.

The first light modulation element positioning step is now explained. Initially, the three color lights in R, G, and B are divided into two groups. More specifically, one of the three color lights in R, G, and B (G light in this example) is classified as a first group, and the other two color lights (R and B lights in this example) are classified as a second group. Then, the positions of the two light modulation elements 410R and 410B are controlled such that the corresponding pixels of the light modulation element 410R and 410B for the two color lights of the second group agree with each other.

Subsequently, the positions of the light modulation elements 410R and 410B for the two color lights of the second group are controlled such that the pixels of the light modulation elements 410R and 410B for the two color lights of the second group are obliquely shifted from the corresponding pixels of the light modulation element 410G for the one color light of the first group by ½ pixel for each. Then, fine adjustment is performed throughout such that the respective light modulation elements have the optimum relative positions.

By this positioning, the respective pixels of the light modulation elements 410R, 410G, and 410B of the first light modulation element unit 400 are positioned as shown in FIG. 2A. In FIG. 2A, the respective pixels of the light modulation elements 410R, 410G, and 410B are overlapped on the same flat plane to show the positional correspondences between the respective pixels of the light modulation elements 410R, 410G, and 410B. In FIG. 2A, squares in light gray indicate pixels $P_G$ of the light modulation element 410G, and squares in dark gray indicate pixels $P_R$ and $P_B$ of the light modulation elements 410R and 410B, respectively.

As illustrated in FIG. 2A, the light modulation element 410R and the light modulation element 410B are positioned such that the pixels of the light modulation element 410R agree with the corresponding pixels of the light modulation element 410B with high accuracy and obliquely shift from the corresponding pixels of the light modulation element 410G by ½ pixel for each. FIG. 2A shows only openings of the respective pixels $P_G$, and $P_B$ of the light modulation elements (liquid $P_R$, crystal panels), and does not show the not opened portions surrounding the openings of the respective pixels. This applies to FIG. 2B and also to FIG. 3 discussed later.

Thus, the first light modulation element unit 400 is positioned such that the respective pixels of the light modulation element 410R and the light modulation element 410B are obliquely shifted from the corresponding pixels of the light modulation element 410G as the reference positions by ½ pixel for each.

According to this embodiment, the first light modulation element positioning step initially positions the two light modulation elements 410R and 410B such that the pixels of the light modulation element 410R agree with the corresponding pixels of the light modulation element 410B, and then obliquely shifts the pixels of the light modulation elements 410R and 410B from the corresponding pixels of the light modulation element 410G by ½ pixel for each. However, the light modulation elements 410R and 410B may be individually positioned based on the respective pixels of the light modulation element 410G as references.

For example, the following method may be employed. The light modulation element 410R is initially positioned such that the pixels of the light modulation element 410R are obliquely shifted from the corresponding pixels of the light modulation element 410G by ½ pixel for each, and then the light modulation element 410B is initially positioned such that the pixels of the light modulation element 410B are obliquely shifted from the corresponding pixels of the light modulation element 410G by ½ pixel for each. Finally, fine adjustment is performed throughout such that the positional relationship shown in FIG. 2A can be achieved. This method is allowed for the second light modulation element positioning step.

The second light modulation element positioning step is now explained. In the second light modulation element positioning step, the two color lights (R, and B) classified as the second group in the first light modulation element positioning step are classified as a third group, and the color light (G) classified as the first group in the first light modulation element positioning step is classified as a fourth group.

Then, the two light modulation elements 610R and 610B corresponding to the two color lights of the third group are positioned such that the corresponding pixels of the light modulation elements for the two color lights agree with each other. Subsequently, the light modulation element 610G corresponding to the one color light of the fourth group is positioned such that the pixels of the light modulation element 610G corresponding to the one color light of the fourth group are obliquely shifted from the corresponding pixels of the two light modulation elements 610R and 610B corresponding to the two color lights of the third group by ½ pixel for each.

By this positioning, the respective pixels of the light modulation elements 610R, 610G, and 610B of the second light modulation element unit 600 are positioned as shown in FIG. 2B. In FIG. 2B, the respective pixels of the light modulation elements 610R, 610G, and 610B are overlapped on the same flat plane to show the positional correspondences between the respective pixels of the light modulation elements 610R, 610G, and 610B similarly to the case shown in FIG. 2A. In FIG. 2B, squares in dark gray indicate pixels $P_R$, and $P_B$ of the light modulation elements 610R and 610B, respectively, and squares in light gray indicate pixels $P_G$ of the light modulation element 610G.

As illustrated in FIG. 23, the light modulation elements 610R and 610B are positioned such that the pixels of the light modulation element 610R agree with the corresponding pixels of the light modulation element 610B with high accuracy. The light modulation element 610G is positioned such that the pixels of the light modulation element 610G are obliquely shifted from the corresponding pixels of the light modulation element 610R and the light modulation element 610B by ½ pixel for each.

Accordingly, in the second light modulation element unit 600, the pixels of the light modulation element 610G are obliquely shifted from the corresponding pixels of the light modulation elements 610R and 610B as reference positions by ½ pixel for each.

The light modulation element unit positioning step is now explained. The light modulation element unit positioning step positions the first light modulation element unit 400 after the first light modulation element positioning step ends, and positions the second light modulation element unit 600 after the second light modulation element positioning step ends. As described above, the light modulation element unit positioning step is performed by using the image projection functions of the light source 100, the polarized light separation mirror 300, the first light guide system 500, the second light guide system 700, the polarized light combining prism 800, the projection system 900 and others under the condition that the first light modulation element unit 400 after completion of the first light modulation element positioning step and the second light modulation element unit 600 after completion of the second light modulation element positioning step are practically assembled into the projector PJ as the product.

In this case, the first light modulation element unit 400 supplies color light from the particular light modulation element included in the light modulation elements 410R, 410G, and 410B (the one light modulation element corresponding to the one color light of the first group) as the first image light, and the second light modulation element unit 600 supplies the color light from the particular light modulation elements included in the light modulation elements 610R, 610G, and 610B (the two light modulation elements corresponding to the two color lights of the third group) as the second image light.

More specifically, the first light modulation element unit 400 supplies the color light corresponding to the pattern image data from the particular light modulation element as the first image light by actuating the particular light modulation element based on the pattern image data, and the second light modulation element unit 600 supplies the color lights corresponding to the pattern image data from the particular light modulation elements as the second image light by actuating the particular light modulation elements based on the pattern image data.

The first image light and the second image light are combined by the polarized light combining prism 800, and projected on the screen SCR by the projection system 900. In this step, the first light modulation element unit 400 and the second light modulation element unit 600 are positioned such that the image projected on the screen SCR (pattern image) has a predetermined color.

In this example, the one light modulation element corresponding to the one color light of the first group of the first light modulation element unit 400 is the light modulation element 410G, and the two light modulation elements corresponding to the two color lights of the third group of the second light modulation element unit 600 are the light modulation elements 610R and 610B. Thus, the green light (G) having the p-polarized light component is outputted as the first image light from the cross dichroic prism 420 of the first light modulation element unit 400, and combined light of the red light (R) and the blue light (B) having the s-polarized light component is outputted as the second image light from the cross dichroic prism 620 of the second light modulation element unit 600. The first image light and the second image light are combined by the polarized light combining prism 800, and the combined light is projected on the screen by the projection system 900.

In this case, the first light modulation element unit 400 and the second light modulation element unit 600 are positioned such that white (W) light can be released from the polarized light combining prism 800. When the light released from the polarized light combining prism 800 becomes white (W), it is considered that the positions of the first light modulation element unit 400 and the second light modulation element unit 600 have an ideal relationship. For realizing the ideal positioning, the position of the second light modulation element unit 600 may be controlled relative to the first light modulation element unit 400 as a reference, or the position of the first light modulation element unit 400 may be controlled relative to the second light modulation element unit 600 as a reference. Alternatively, both the first light modulation element unit 400 and the second light modulation element unit 600 may be positioned such that both the units 400 and 600 have the ideal positional relationship.

Figure 3:
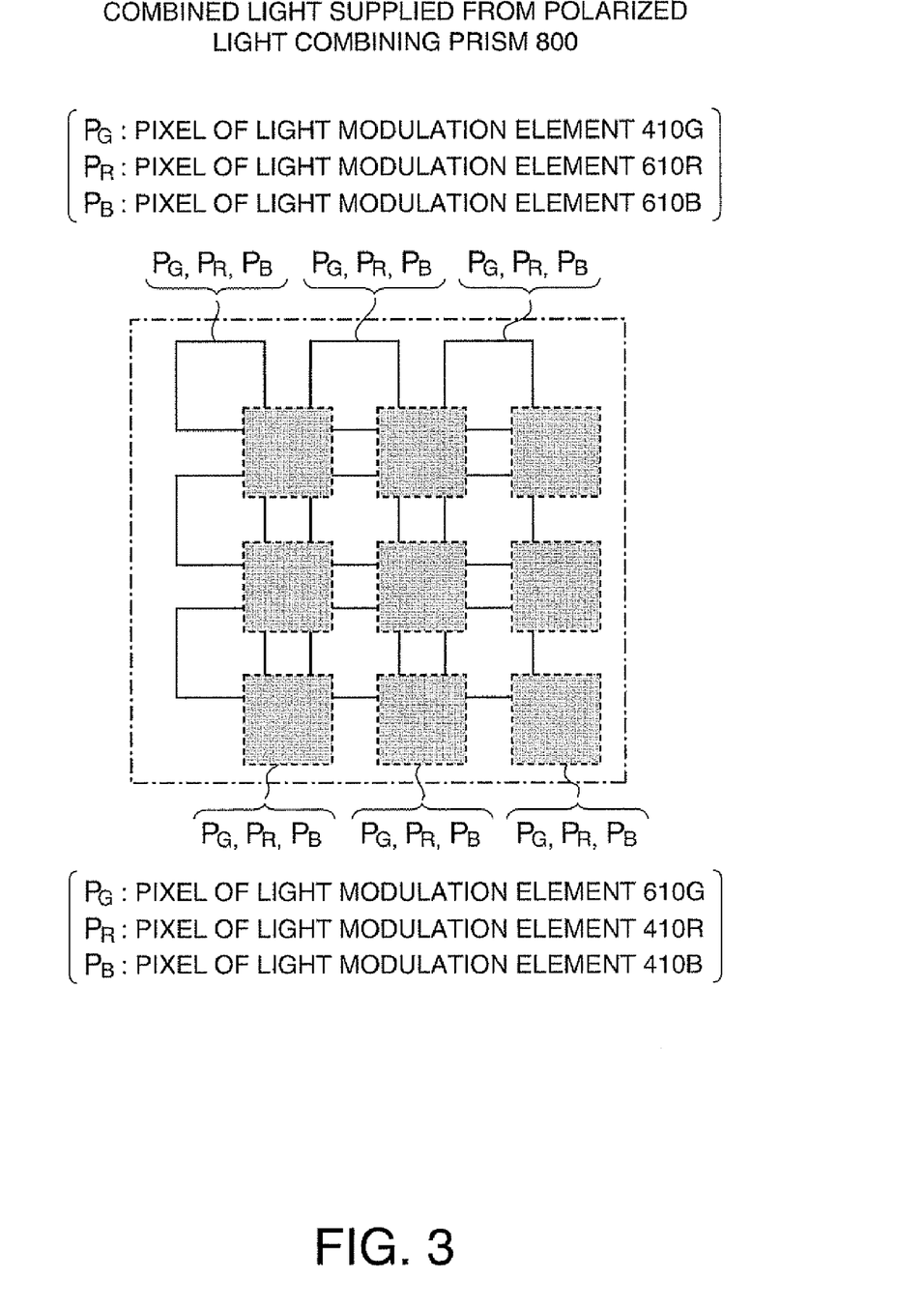
FIG. 3 schematically illustrates image light combined by a polarized light combining prism after positioning by a light modulation element unit positioning step.

FIG. 3 schematically illustrates the combined light released from the polarized light combining prism 800 after completion of the positioning by the light modulation element positioning step. As illustrated in FIG. 3, the light modulation element 410G of the first light modulation element unit 400 supplies the green light (G) as the first image light, and the light modulation elements 610R and 610B of the second light modulation element unit 600 supply the combined light of the red light (R) and the blue light (B) as the second image light. When the light of the first and second image lights combined by the polarized light combining prism 800 becomes white (W) as illustrated in FIG. 3, the positions of the first light modulation element unit 400 and the second light modulation element unit 600 have an ideal relationship.

In FIG. 3, white squares indicate pixels having white color (W). This applies to the pixels $P_G$ of the light modulation element 410G of the first light modulation element unit 400, and the pixels $P_R$ and $P_B$ of the light modulation elements 610R and 610B of the second light modulation element unit 600.

Accordingly, when the combined light released from the polarized light combining prism 800 becomes white (W), it is considered that the first light modulation element unit 400 and the second light modulation element unit 600 have an ideal positional relationship provided by highly accurate positioning.

Under the ideal positional relationship as illustrated in FIG. 3, the pixels of the light modulation element 410G of the first light modulation element unit 400 agree with the corresponding pixels of the light modulation elements 610R and 610B of the second light modulation element unit 600. Also, the pixels of the light modulation elements 410R and 410B of the first light modulation element unit 400 agree with the corresponding pixels of the light modulation element 610G of the second light modulation element unit 600. Moreover, the pixels of the light modulation elements 410G, 610R, and 610B shift from the corresponding pixels of the light modulation elements 410R, 410B, and 610G by ½ pixel for each as illustrated in FIG. 3.

According to the light modulation element positioning method for the projector in this embodiment, a pixel shift condition similar to an oblique pixel shift condition of the first light modulation element unit and the second light modulation element unit in the related art can be achieved as illustrated in FIG. 3. In the oblique pixel shift condition of the first light modulation element unit and the second light modulation element unit in the related art, the corresponding pixels of the light modulation elements 410R, 410G, and 410B for the R, G, and B lights of the light modulation element unit 400 are highly accurately matched, and similarly the pixels of the light modulation elements 610R, 610G, and 610B for the R, G, and B lights are highly accurately matched. Then, the positions of the first light modulation element unit 400 and the second light modulation element unit 600 are controlled such that the corresponding pixels of the first and second light modulation units 400 and 600 are shifted by ½ pixel for each. In case of the light modulation element positioning method for the projector according to this embodiment, the pixel shift condition similar to the oblique pixel shift condition of the first light modulation element unit and the second light modulation element unit in the related art can be achieved as illustrated in FIG. 3.

Figure 4:
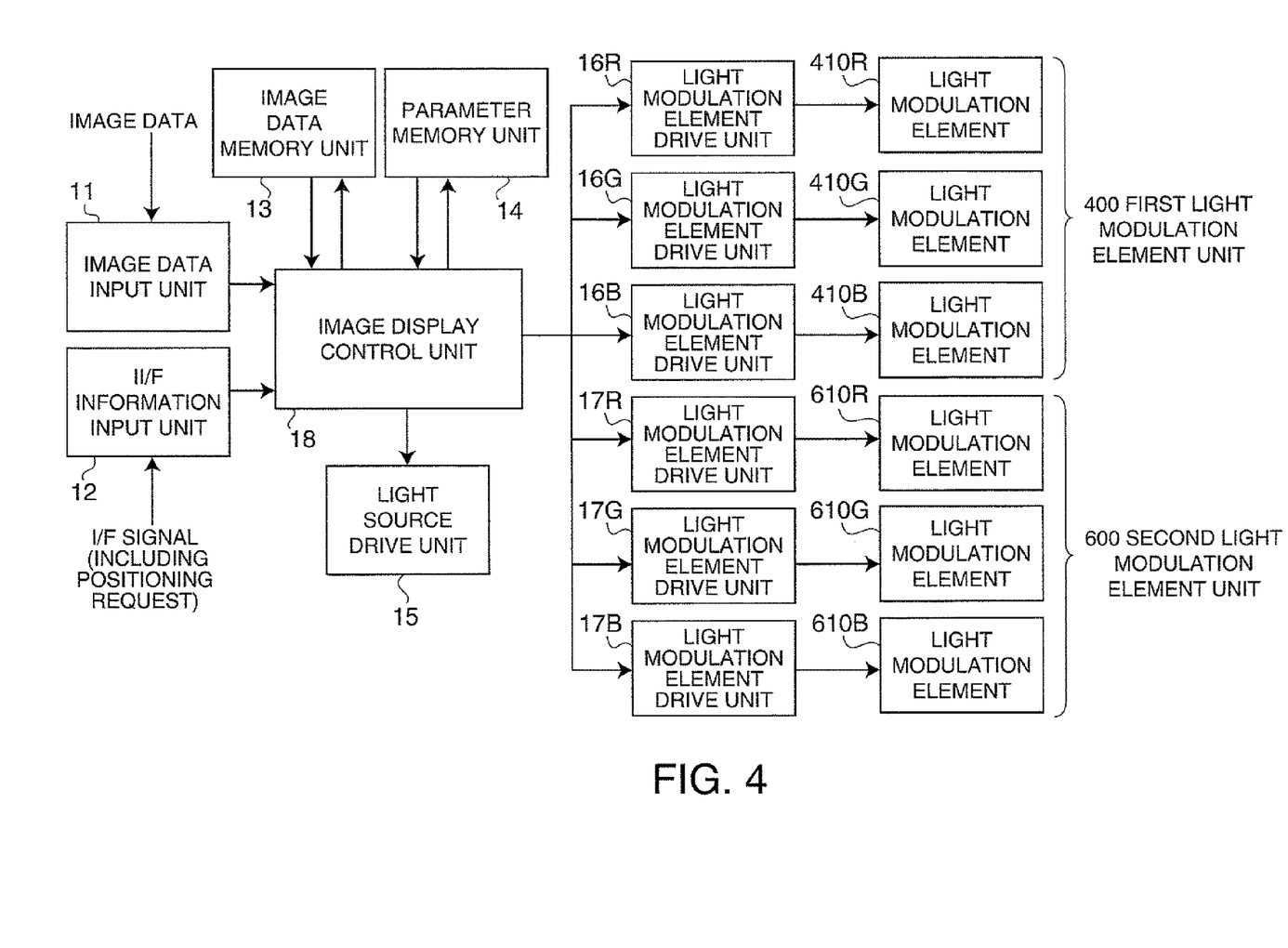
FIG. 4 is a function block diagram of the projector PJ according to the embodiment.

FIG. 4 is a function block diagram of the projector PJ according to this embodiment. As shown in FIG. 4, the projector PJ includes: an image data input unit 11 to which images to be displayed are inputted; an I/F information input unit 12 to which various types of user interface information (I/F information) such as requests by a user (including positioning request) and setting can be inputted; an image data memory unit 13 which temporarily retains inputted image data and stores positioning pattern image data for positioning and the like; a parameter memory unit 14 which stores parameters used for various types of corrections; a light source drive unit 15 which drives the light source 100 (see FIG. 1); light modulation element drive units 16R, 16G, and 16B which drive the light modulation elements 410R, 410G, and 410B (see FIG. 1), respectively, contained in the first light modulation element unit 400; light modulation element drive units 17R, 17G, and 17B which drive the light modulation elements 610R, 610G, and 610B (see FIG. 1), respectively, contained in the second light modulation element unit 600; and an image display control unit 18 which controls the overall operations of the projector PJ such as processes based on the image data inputted to the image data input unit 11, the I/F information inputted to the I/F information input unit 12 and the like.

The image display control unit 18 also actuates the particular light modulation elements of the first light modulation element unit 400 and the second light modulation element unit 600 during the light modulation element unit positioning step. For example, when receiving a positioning request from the I/F information input unit 12, the image display control unit 18 sets the projector PJ in a positioning mode and reads the positioning pattern image data from the image data memory unit 13 to give the pattern image data thus read to the appropriate light modulation element drive units.

More specifically, in the positioning mode, the image display control unit 18 actuates the light modulation element 410G of the first light modulation element unit 400 and the light modulation elements 610R and 610B of the second light modulation element unit 600. Then, the image display control unit 18 reads the positioning pattern image data from the image data memory unit 13 and gives the obtained positioning pattern image data to the corresponding light modulation element drive units (the light modulation element drive units 16G, 17R, and 17B in this example).

By this step, the light modulation element 410G of the first light modulation element unit 400 is operated, and the light modulation elements 610R and 610B of the second light modulation element unit 600 are operated. As a result, the green light (G) modulated based on the pattern image data is outputted from the cross dichroic prism 420 (see FIG. 1) of the first light modulation element unit 400 as the first image light, and the combined light of the red light (R) and the blue light (B) modulated based on the pattern image data is outputted from the cross dichroic prism 620 (see FIG. 1) of the second light modulation element unit 600 as the second image light. The first image light and the second image light are combined by the polarized light combining prism 800, and projected on the screen SCR (see FIG. 1) through the projection system 900 (see FIG. 1).

As a result, the image corresponding to the positioning pattern image data is projected on the screen SCR. Then, the first light modulation element unit 400 and the second light modulation element unit 600 are disposed at the ideal positions by positioning the first and second light modulation element units 400 and 600 such that the image displayed on the screen SCR (the positioning pattern image) becomes white (W).

In the structure shown in FIG. 4, the positioning pattern image data is stored in the image data memory unit 13 and read from the image data memory unit 13 as necessary. However, the positioning image data may be supplied from the outside to the image data input unit 11.

In positioning the first light modulation element unit 400 and the second light modulation element unit 600 such that the white (W) image can be projected on the screen SCR (see FIG. 1), it is preferable that the white color becomes as uniform as possible throughout the area of the image. More specifically, there is possibility that the degree of whiteness of the entire area of the image projected on the screen SCR becomes non-uniform due to the effect of the optical systems or the like. In this case, it is preferable that the first light modulation element unit 400 and the second light modulation element unit 600 are positioned such that the degree of whiteness becomes as uniform as possible throughout the image.

In practicing the positioning method described in this embodiment, the image projected on the screen SCR may be visually checked by an operator. Alternatively, the positioning method may be performed based on image data corresponding to images projected on the screen SCR and captured by an image capture unit (not shown in FIG. 4). In this case, discrete plural positions covering the entire area of the image projected on the screen SCR are set as sampling positions, and positioning is performed such that errors of all pixel values obtained at the respective sampling positions can be reduced as much as possible.

The invention is not limited to the embodiment described herein, but may be practiced otherwise without departing from the scope of the invention. For example, the following modifications (1) through (6) can be made.

(1) In performing the light modulation element unit positioning step in this embodiment, the light modulation element corresponding to the one color light of the first group (the light modulation element 410G) of the first light modulation element unit 400 is actuated, and the light modulation elements corresponding to the two color lights of the third group (the light modulation elements 610R and 610B) of the second light modulation element unit 600 are actuated. However, the light modulation elements corresponding to the two color lights of the second group (the light modulation elements 410R and 410B) of the first light modulation element unit 400 may be actuated, and the light modulation element corresponding to the one color light of the fourth group (the light modulation element 610G) of the second light modulation element unit 600 may be actuated, for example.

(2) In performing the light modulation element unit positioning step in this embodiment, the white light (W) is produced by actuating the light modulation element corresponding to the one color light of the first group (the light modulation element 410G) of the first light modulation element unit 400, and the light modulation elements corresponding to the two color lights of the third group (the light modulation elements 610R and 610B) of the second light modulation element unit 600. However, only either the light modulation element 610R or the light modulation element 610B of the second light modulation element unit 600 (only the light modulation element 610R, for example) may be actuated. In this case, positioning is performed based on the color produced by combining the green light (G) and the red light (R).

(3) According to this embodiment, the green light (G) is classified as one group, and the red light (R) and the blue light (B) are classified as one group in dividing the three color lights in R, G, and B into two groups. However, the green light (G) and the blue light (B) may be classified as one group, and the red light (R) may be classified as one group, for example. Alternatively, the green light (G) and the red light (R) may be classified as one group, and the blue light (B) may be classified as one group.

(4) According to this embodiment, the pixels of the first light modulation element unit 400 are obliquely shifted from the corresponding pixels of the second light modulation element unit 600 by ½ pixel for each. However, the pixel shift direction and the pixel shift amount are not limited to these specific examples.

(5) According to this embodiment, light emitted from one light source is divided into p-polarized light and s-polarized light by the polarized light separation system (the polarized light separation mirror 300), and the separated p-polarized light and s-polarized light are supplied to the corresponding image forming units (the first light modulation element unit 400 and the second light modulation element unit 600). However, p-polarized light may be produced from light emitted from one of two light sources by using a polarization converting element, and s-polarized light may be produced from light emitted from the other light source by using a polarization converting element. Then, the produced p-polarized light and s-polarized light may be supplied to the corresponding light modulation element units (the first light modulation element unit 400 and the second light modulation element unit 600).

(6) According to this embodiment, a lamp having an arc tube is used as the light source. However, a solid light source such as LED (light emitting diode) may be employed.

The entire disclosure of Japanese Patent Application No. 2009-088706, filed Apr. 1, 2009 is expressly incorporated by reference herein.

What is claimed is:

1. A method for positioning a light modulation element of a projector comprising:

providing the projector including
a first light modulation element unit having a first light modulation element for modulating a first color light and forming a first image, a second light modulation element for modulating a second color light and forming a second image, a third light modulation element for modulating a third color light and forming a third image, and a first combining system for combining the respective color lights modulated by the first through third light modulation elements and supplies first image light,
a second light modulation element unit having a fourth light modulation element for modulating the first color light and forming a fourth image, a fifth light modulation element for modulating the second color light and forming a fifth image, a sixth light modulation element for modulating the third color light and forming a sixth image, and a second combining system for combining the respective color lights modulated by the fourth through sixth light modulation elements and supplies second image light, and
a combining system for combining the first image light supplied from the first light modulation element unit and the second image light supplied from the second light modulation element unit and supplying combined light;

positioning pixels of the first through third images such that the pixels of the first image agree with the corresponding pixels of the second image and that the pixels of the first image and the second image shift from the corresponding pixels of the third image by a predetermined amount in a predetermined direction;

positioning pixels of the fourth through sixth images such that the pixels of the fourth image agree with the corresponding pixels of the fifth image and that the pixels of the sixth image shift from the corresponding pixels of the fourth image and the fifth image by a predetermined amount in a predetermined direction; and obtaining the color lights from the first light modulation element and the second light modulation element of the first light modulation element unit, and the color light from the sixth light modulation element of the second light modulation element unit, and positioning the first light modulation element unit and the second light modulation element unit such that the color of combined light of the color lights obtained from the first light modulation element, the second light modulation element, and the sixth light modulation element and combined by the combining system becomes a predetermined color.

2. The method for positioning the light modulation element of the projector according to claim 1, wherein:

positioning the pixels of the first through third images and positioning the pixels of the fourth through sixth images are performed before the first light modulation element unit and the second light modulation element unit are assembled into the projector; and obtaining the respective color lights and positioning the first light modulation element unit and the second light modulation element unit are performed after the first light modulation element unit and the second light modulation element unit are assembled into the projector.

3. The method for positioning the light modulation element of the projector according to claim 1, wherein:

the predetermined direction of shifting the pixels for the positioning is an oblique direction; and the predetermined amount of shifting the pixels for the positioning is ½ pixel for each of the pixels.

4. The method for positioning the light modulation element of the projector according to claim 1, wherein:

the first through third color lights are red light, blue light, and green light, respectively;

the first light modulation element and the second light modulation element are a light modulation element for red light and a light modulation element for blue light, respectively, and the third light modulation element is a light modulation element for green light; and the fourth light modulation element and the fifth light modulation element are a light modulation element for red light and a light modulation element for blue light, respectively, and the sixth light modulation element is a light modulation element for green light.

5. A projector, comprising:

a first light modulation element unit having a first light modulation element for modulating a first color light and forming a first image, a second light modulation element for modulating a second color light and forming a second image, a third light modulation element for modulating a third color light and forming a third image, and a first combining system for combining the respective color lights modulated by the first through third light modulation elements and supplies first image light to dispose pixels of the first image at such positions as to agree with corresponding pixels of the second image and to dispose the pixels of the first image and the second image at such positions as to shift from corresponding pixels of the third image by a predetermined amount in a predetermined direction;

a second light modulation element unit having a fourth light modulation element for modulating the first color light and forming a fourth image, a fifth light modulation element for modulating the second color light and forming a fifth image, a sixth light modulation element for modulating the third color light and forming a sixth image, and a second combining system for combining the respective color lights modulated by the fourth through sixth light modulation elements and supplies second image light to dispose pixels of the fourth image at such positions as to agree with corresponding pixels of the fifth image and to dispose the pixels of the fourth image and the fifth image at such positions as to shift from corresponding pixels of the sixth image by a predetermined amount; and a combining system for combining the first image light supplied from the first light modulation element unit and the second image light supplied from the second light modulation element unit and supplying combined light, wherein the pixels of the third image are formed substantially at the same positions as the positions of the pixels of the fourth image and the fifth image, and the pixels of the sixth image are formed substantially at the same positions as the positions of the pixels of the first image and the second image.

\* \* \* \* \*